US012625705B1

(12) United States Patent
Fee et al.

(10) Patent No.: US 12,625,705 B1
(45) Date of Patent: May 12, 2026

(54) CACHE LINE HOLD STATE FOR MULTIPROCESSING COMPUTING SYSTEMS

(71) Applicant: International Business Machines Corporation, Armonk, NY (US)

(72) Inventors: Michael Fee, Cold Spring, NY (US); Deanna Postles Dunn Berger, Hyde Park, NY (US); Peter Kenneth Szwed, Rhinebeck, NY (US); Seth E. Lederer, Staatsburg, NY (US); Aaron Tsai, Hyde Park, NY (US); Timothy J Slegel, Staatsburg, NY (US); Jason D Kohl, Austin, TX (US); Robert J Sonnelitter, III, Bedford Hills, NY (US); Gregory William Alexander, Pflugerville, TX (US); Andrew Walter Piechowski, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/979,915

(22) Filed: Dec. 13, 2024

(51) Int. Cl.
G06F 9/30 (2018.01)
G06F 9/38 (2018.01)

(52) U.S. Cl.
CPC ...... G06F 9/30047 (2013.01); G06F 9/30043 (2013.01)

(58) Field of Classification Search
CPC ............. G06F 9/30043; G06F 9/30047; G06F 9/3834; G06F 9/52
See application file for complete search history.

(56) References Cited

U.S. PATENT DOCUMENTS

| | | | | | |
|---|---|---|---|---|---|
| 7,222,222 | B1 * | 5/2007 | Vartti | .................. | G06F 12/0828 |
| | | | | | 711/158 |
| 7,966,453 | B2 * | 6/2011 | Shum | .................... | G06F 3/0614 |
| | | | | | 711/121 |
| 10,579,525 | B2 | 3/2020 | Zoellin et al. | | |
| 11,216,378 | B2 | 1/2022 | King et al. | | |
| 2018/0173625 | A1 * | 6/2018 | Moudgill | .............. | G06F 9/3861 |
| 2018/0196751 | A1 * | 7/2018 | Giamei | .............. | G06F 12/0842 |
| 2019/0042432 | A1 * | 2/2019 | Khade | .................. | G06F 11/3409 |
| 2023/0136114 | A1 * | 5/2023 | Moyer | ................ | G06F 12/0815 |
| | | | | | 711/118 |
| 2023/0281132 | A1 * | 9/2023 | Berger | ................ | G06F 12/0891 |
| | | | | | 711/135 |

OTHER PUBLICATIONS

Disclosed Without Attribution, IP.com No. IPCOM000033803D "Method for Software-Enforced Strict Processor Affinity to Reduce Coherency Traffic in a Cache-Coherent MP System", Dec. 28, 2004, 5 pages.

* cited by examiner

*Primary Examiner* — Jacob Petranek
(74) *Attorney, Agent, or Firm* — CANTOR COLBURN LLP; Edward Wixted

(57) ABSTRACT

A present invention embodiment provides a cache line hold state that reduces cache contention. A first processor executes a store instruction to acquire a lock on a cache line in a shared memory system of a multiprocessor computing system. The first processor sets the cache line to an exclusive state in a local cache of the first processor upon successful acquisition of the lock. A lock state indicative of a windowed hold on the cache line is recorded by the first processor, wherein the windowed hold enables non-exclusive fetch requests from one or more other processors.

20 Claims, 8 Drawing Sheets

400

CACHE LINE HOLD STATE FOR MULTIPROCESSING COMPUTING SYSTEMS

BACKGROUND

1. Technical Field

Present invention embodiments relate to multiprocessing computing systems, and more specifically, to cache line hold states for multiprocessing computing systems.

2. Discussion of the Related Art

In a multiprocessing computing system, some instructions can synchronize events across the processors. One type of synchronizing event performs a lock that permits only one core or thread to perform a particular task at a given time. This type of instruction may require a core or thread to exclusively hold a memory location (e.g., a cache line), which prevents the other cores or threads from accessing the memory location. When other processors compete to access a cache line at the same time, such locks can introduce significant delays in referencing and/or manipulating memory, a process known as cache line contention.

SUMMARY

According to one embodiment of the present invention, a system is provided utilizing a cache line hold state that reduces cache contention. A first processor executes a store instruction to acquire a lock on a cache line in a shared memory system of a multiprocessor computing system. The first processor sets the cache line to an exclusive state in a local cache of the first processor upon successful acquisition of the lock. A lock state indicative of a windowed hold on the cache line is recorded by the first processor, wherein the windowed hold enables non-exclusive fetch requests from one or more other processors. Embodiments of the present invention further include methods for utilizing a cache line hold state that reduces cache contention in substantially the same manner described above.

BRIEF DESCRIPTION OF THE DRAWINGS

Generally, like reference numerals in the various figures are utilized to designate like components.

DETAILED DESCRIPTION

Figure 1:
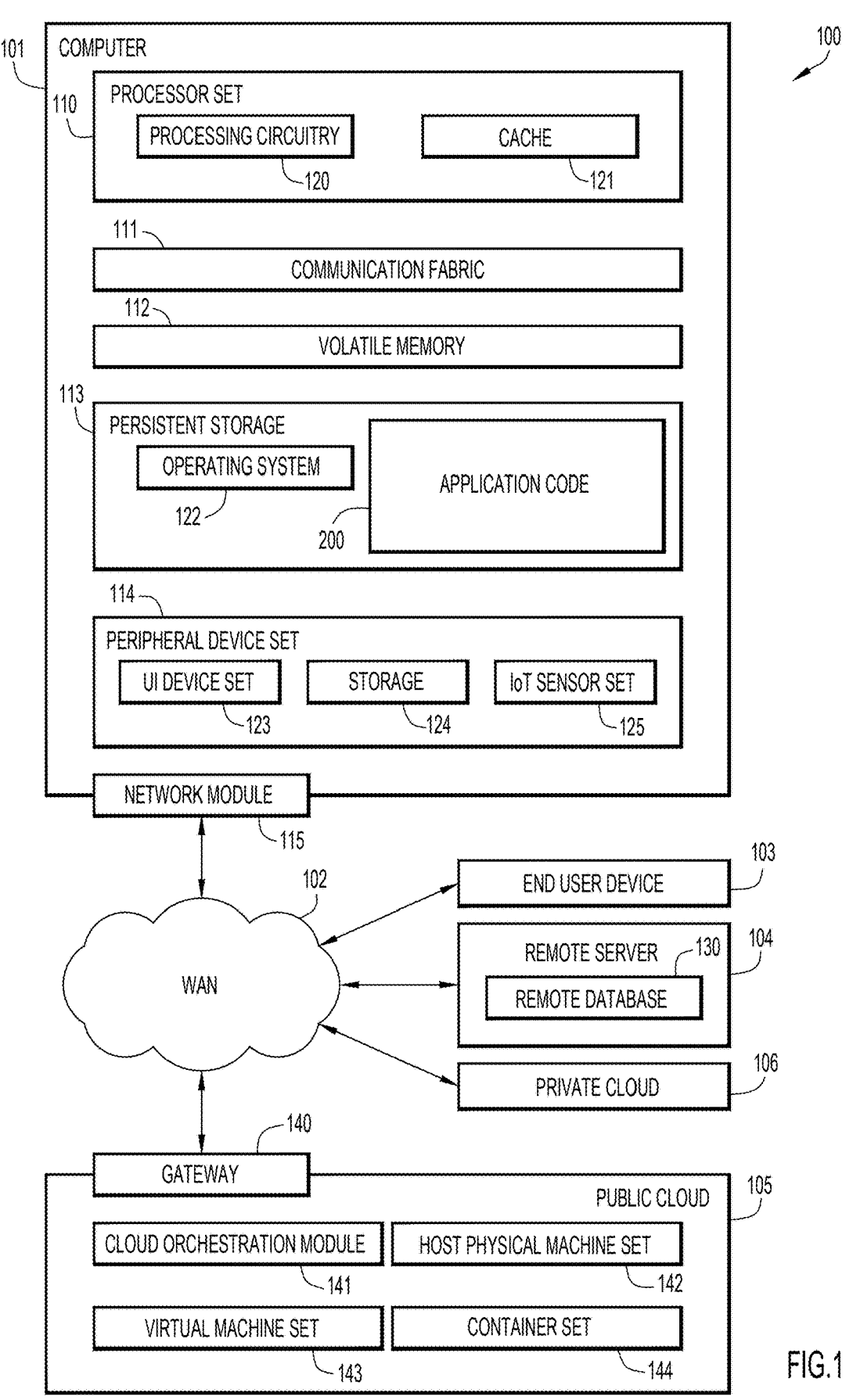
FIG. 1 is a diagrammatic illustration of an example computing environment according to an embodiment of the present invention.

A present invention embodiment relates to multiprocessing computing systems, and more specifically, to cache line hold states for multiprocessing computing systems. A cache line hold state refers to a status of a cache line, which is a portion of a multiprocessing system's cache memory. In order to maintain cache coherency across multiple processors, various cache line states can determine which processors can perform operations with respect to the subject cache line, such as read or write operations. A cache line can be held by a core in any of various states, including an exclusive state (in which only the holding processor can access or modify the cache line), a read-only state (in which other processors may read but not modify the cache line), and/or other states or variations thereof. In addition to determining whether cores can read, write, and/or share cache lines, cache line states can also indicate whether data in a cache line is up-to-date, and can enforce cache coherence rules.

One cache line state is a long-hold state, which can be utilized in cases where a serialized semaphore lock is contested. Specifically, a long-hold state enables a core to hold a cache line as exclusive for a length of time, after which the core can release the lock without having to reacquire the line. However, conventional long-hold states may be counterproductive because the cache line is held as exclusive for a longer duration of time than is necessary (i.e., a length of time that is detrimental to other cores or threats that may attempt to observe the value of the lock). When a work queue involves several cores moving through the queue simultaneously, there can be contention over the same cache line that is subject to a long-hold.

The embodiments presented herein address this problem by providing a mechanism in which contesting cores can move onto another work element should they encounter a busy (e.g., long-held) cache line, which also minimizes any interference to the owning process by the holding core. In particular, a new hold, referred to herein as a windowed hold, is provided that enables other cores to access the data of a held cache line, and optionally, to inform other cores that the cache line is held. Thus, present embodiments reduce cache line contention by enabling other cores to move forward in their processing queues rather than becoming stuck until the long-hold is released.

Present invention embodiments therefore improve the technical field of computing by improving the performance of multiprocessing systems. As compared to conventional techniques, present invention embodiments enable cores to move forward in their processing queues by providing a new windowed hold mechanism. The embodiments presented herein provide several practical applications, including reducing cache line contention, improving concurrency in work queues by reducing unnecessary serialization, and/or avoiding wasted core cycles by preventing blind contention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as application code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
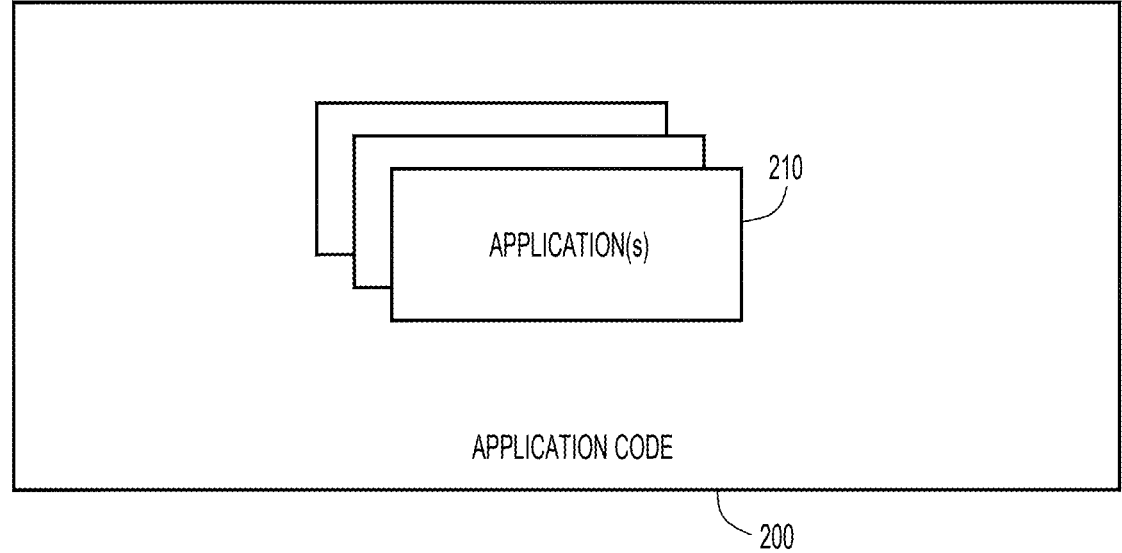
FIG. 2 is a block diagram of application code according to an embodiment of the present invention.

A block diagram of application code 200 according to an embodiment of the present invention is illustrated in FIG. 2. Specifically, application code 200 one or more applications 210. Each application 210 may include one or more modules or units to perform various functions of present invention embodiments described herein. Each application 210 may be implemented by any combination of any quantity of software and/or hardware modules or units, and may reside within volatile memory 112 of computer 101 for execution by a processor, such as processor set 110.

Application(s) 210 may include any software that is configured to be executed in a multiprocessor computing environment. Any of application(s) 210 may be configured to execute code in the multiprocessing embodiments described herein in which a windowed hold state is implemented to reduce cache line contention. Thus, application(s) 210 may execute in an optimized manner in which operations are spread across multiple cores, which can process their corresponding queues without being interrupted from exclusively-held cache lines.

Figure 3:
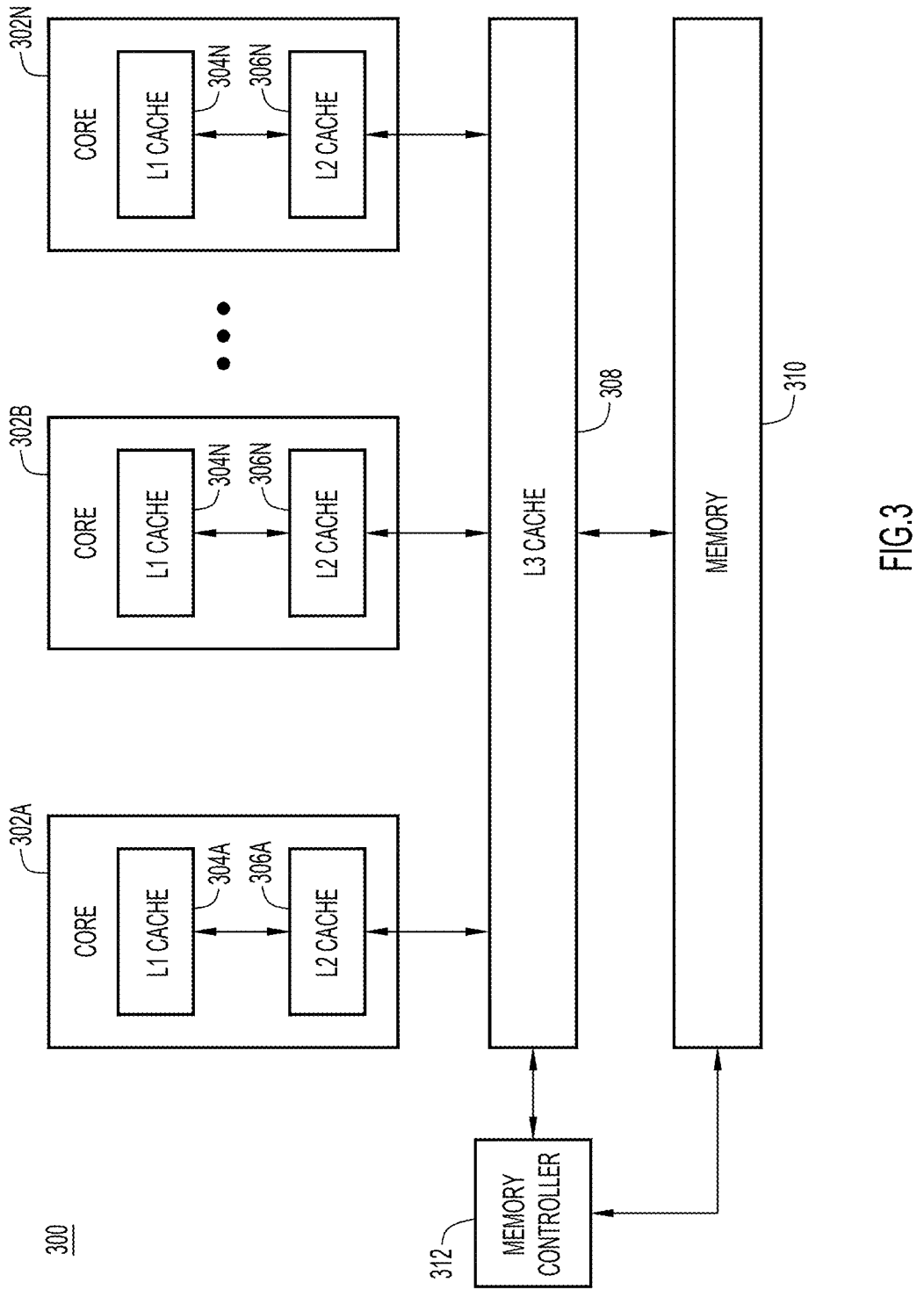
FIG. 3 is a block diagram of a multiprocessing computing environment according to an embodiment of the present invention.

With reference now to FIG. 3, a block diagram is provided of a multiprocessing computing environment 300 according to an embodiment of the present invention. As depicted, the multiprocessing computing environment 300 includes a plurality of cores 302A-302N, each of which may include an L1 cache 304A-304N and an L2 cache 306A-306N; multiprocessing computing environment 300 also includes an L3 cache 308, memory 310, and a memory controller 312.

Each core 302A-302N may represent a processor or thread of the multiprocessing computing environment 300. As such, each core 302A-302N may independently execute tasks such as fetching, decoding, and executing instructions. The cores 302A-302N may collectively operate to perform parallel processing, as an operating system or other application can distribute tasks among the cores 302A-302N. Each core may include one or more caches that are private to the core, such as an L1 cache (e.g., L1 cache 304A-304N) and an L2 cache (e.g., L2 cache 306A-306N). additionally, a shared cache may be provided (e.g., L3 cache 308). In some embodiments, an L1 cache may be smaller and faster than an L2 cache, which in turn is smaller and faster than an L3 cache. Memory 310 may be a volatile memory from which data is loaded into the L3 cache 308, and may correspond to volatile memory 112, as depicted and described with reference to FIG. 1. Memory controller 312 may manage the flow of data between memory 310 and cores 302A-302N by forwarding data from memory 310 to various caches and writing data back to memory 310.

Various instructions may be executed in multiprocessing environment 300. When a core requires writing to a cache line, the core may hold the line as exclusive, which is a type of hold that prevents other cores from accessing the line. Thus, for example, if core 302A holds a cache line as exclusive, cores 302B and/or 302N cannot read from, or write to, that cache line. However, the other cores may have instructions in their own pipelines that involve reading from the exclusively-held cache line in order to move forward in their processing queues. This can introduce delays, as a core that holds a line as exclusive may continue writing to that line until it is finished with a set of operations, upon which the cache line is released. These delays can be exacerbated in the case of a long-hold state, which is a type of extended hold that a core can perform. Present embodiments provide a new type of holding instruction, referred to as a windowed hold, that a core can utilize before entering a long-hold state. This windowed hold enables other cores to read the data of the cache line, which enables the other cores to move forward in their processing queues before the cache line is long-held.

FIGS. 4A-4D are block diagrams of a multiprocessing computing environment 400 in which a windowed hold is performed according to an embodiment of the present invention. FIGS. 4A-4D illustrate multiprocessing computing environment 400 in various points in time of processing. As depicted, multiprocessing computing environment 400 includes at least two cores (core 402 and core 406) and a cache line 404 that is under contention.

Figure 4A:
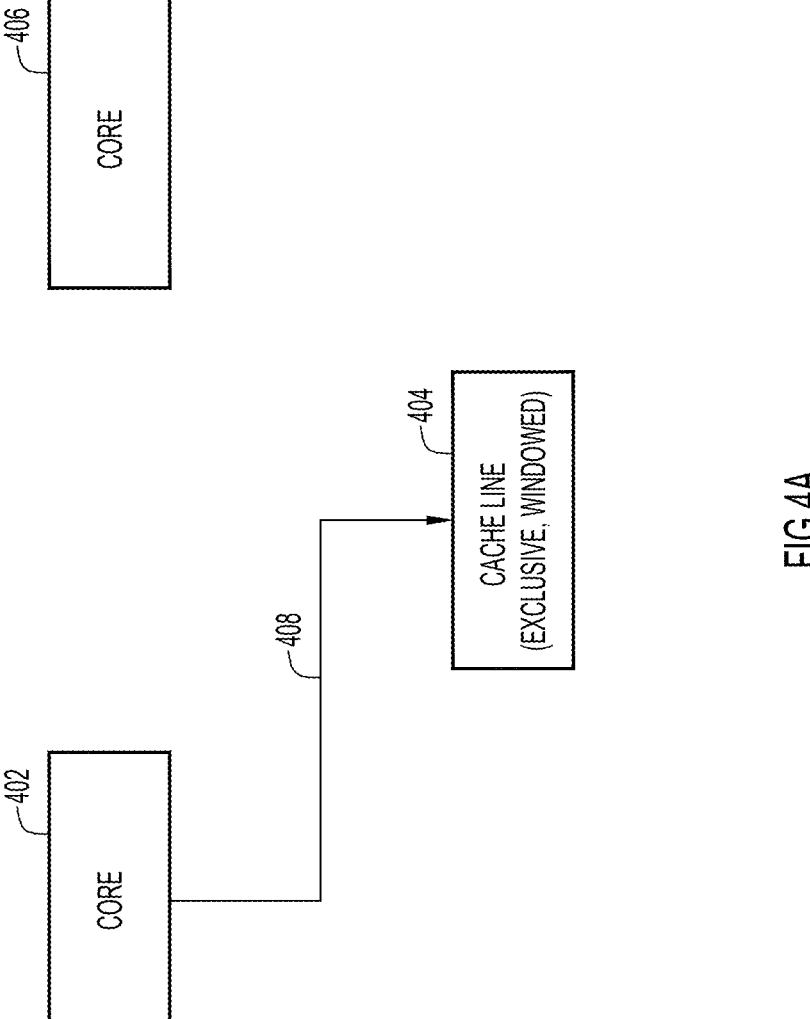
FIGS. 4A-4D are block diagrams of a multiprocessing computing environment in which a windowed hold is performed according to an embodiment of the present invention.

Initially, FIG. 4A depicts a holding processor, core 402, which executes a store instruction that attempts to acquire a lock on cache line 404 and set a windowed hold state. The instruction may indicate that a windowed hold state should be acquired, which may be indicated via a hint instruction on an existing store instruction, or implemented using a special store instruction (i.e., a new instruction configured in the firmware and/or the instruction set architecture). In various embodiments in which the windowed hold is indicated by a hint instruction, the hint instruction may be included on a compare and swap instruction, a test and set instruction, a fetch and add instruction, or other such instructions that involve writing to a cache line. In the depicted example of FIG. 4A, core 402 is the winner (i.e., the lock value is successfully stored), and the state of cache line 404 is set to exclusive to core 402 and in the windowed hold state at operation 408. This state can be stored in the tracking logic, and can be indicated via an entry in a store buffer (STB) or store queue (STQ).

Figure 4B:
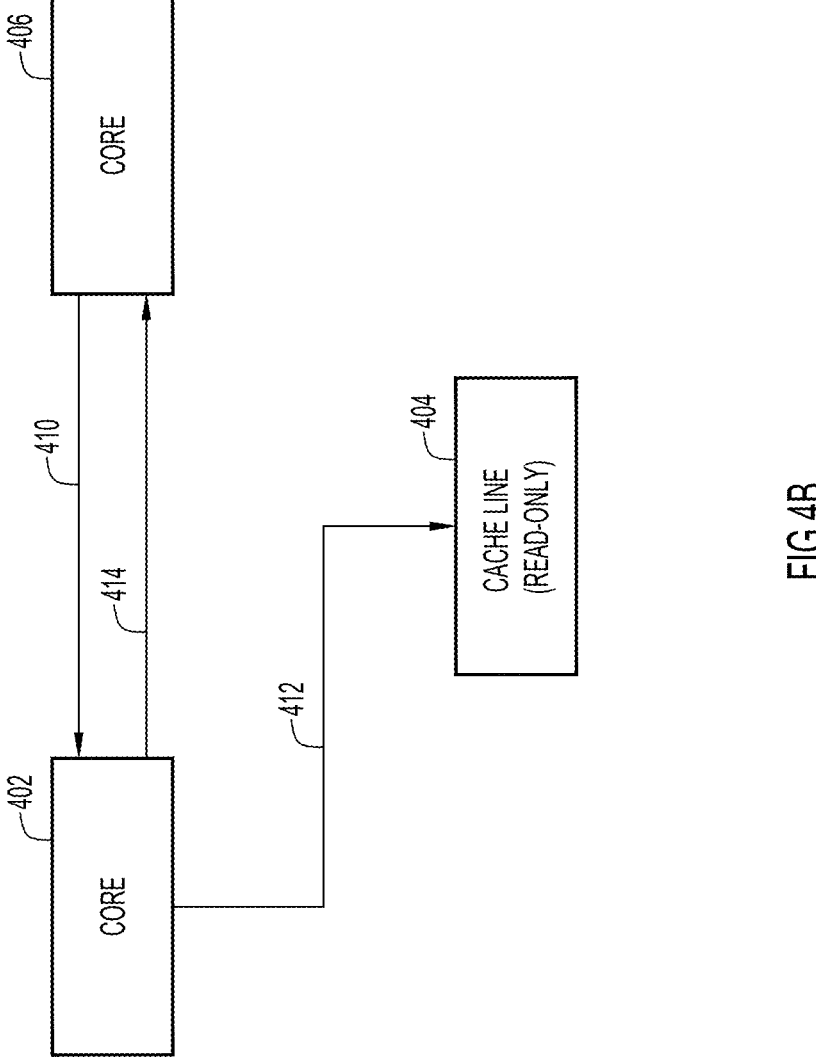

Next, FIG. 4B depicts a non-exclusive fetch request from core 406 (operation 410) that arrives at the holding core 402. Because of the windowed hold state, core 402 demotes cache line 404 to read-only at operation 412, and returns the data of cache line 404 to core 406 at operation 414. Since cache line 404 is read-only, any write request from another core would still be rejected, which also ensures that core 402 can reacquire an exclusive hold so that core 402 can write to cache line 404. While Core 402 temporarily loses exclusive ownership of the line, Core 402 retains read-only ownership of the line and retains ownership of the lock.

Figure 4C:
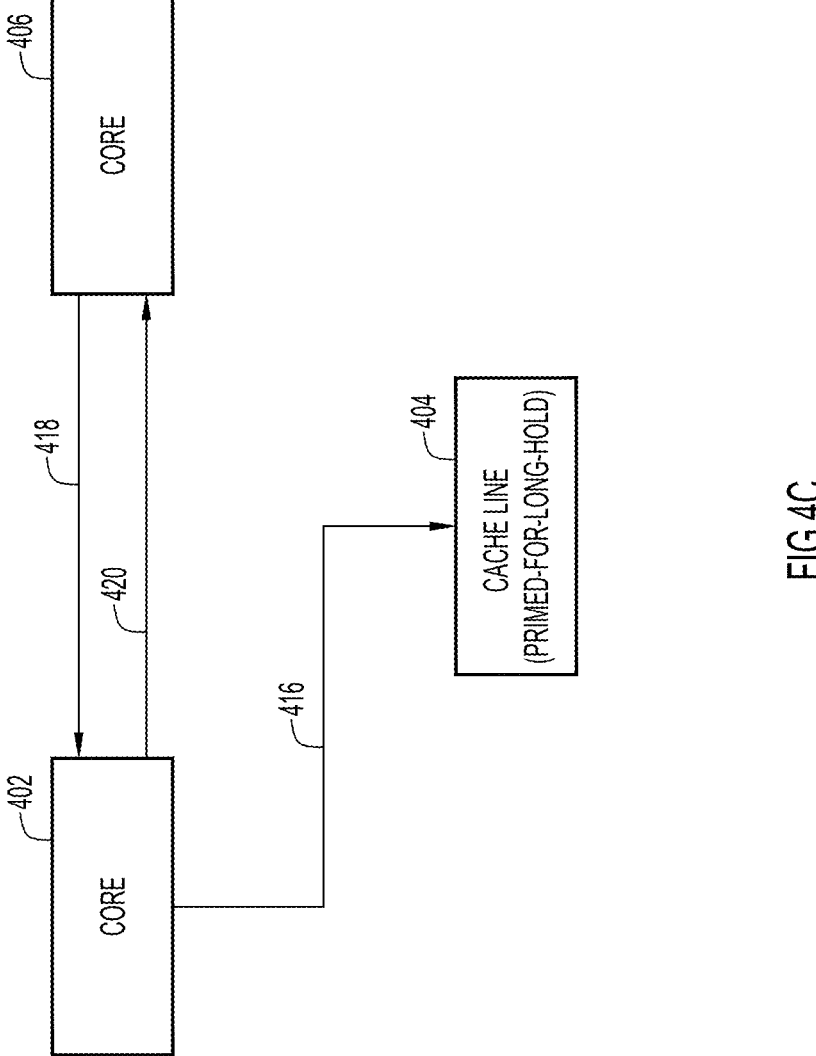

After demoting the cache line 404 to read-only and returning data to core 406, core 402 sets the cache line 404 to a primed-for-long-hold state, as shown at operation 416 in FIG. 4C. During the primed-for-long hold state, any exclusive fetch request is rejected. However, a non-exclusive fetch is still permitted. As shown in FIG. 4C, core 406 performs a non-exclusive fetch at operation 418, and data is returned to core 406 at operation 420 while the cache line 404 remains in the primed-for-long-hold state.

Figure 4D:
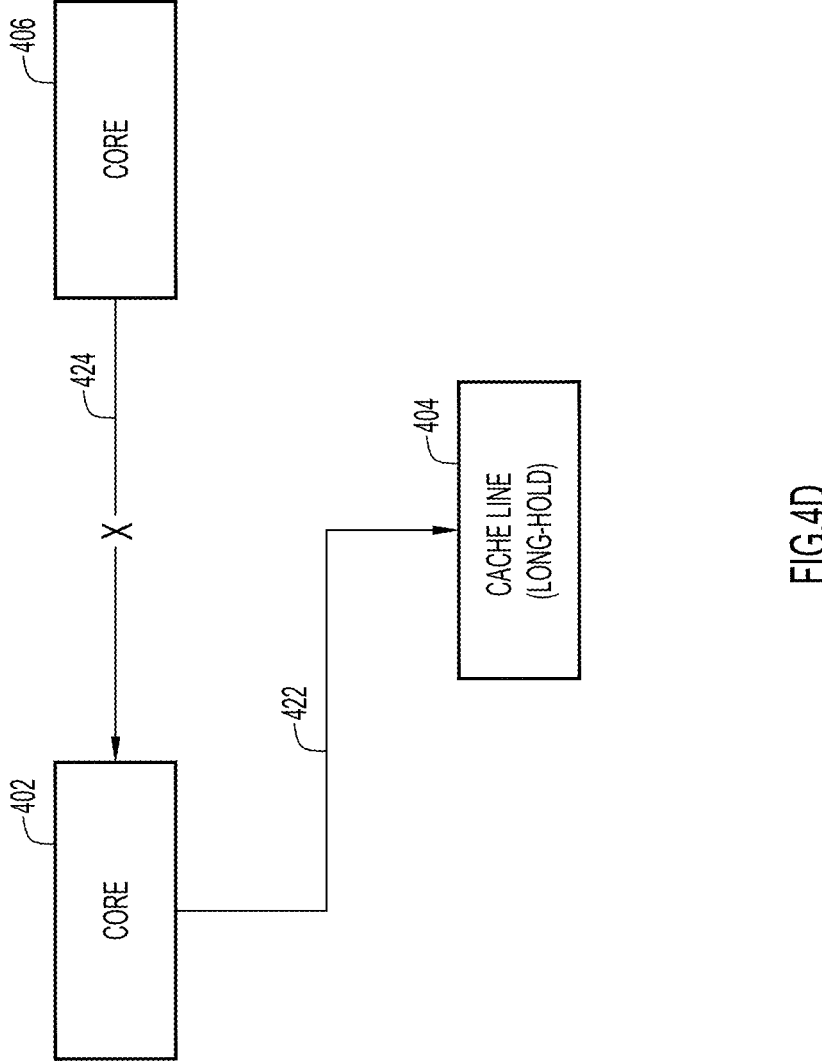

With reference now to FIG. 4D, after the primed-for-long-hold state, core 402 acquires cache line 404 via a long hold state at operation 422. This operation 422 is performed after the holding processor (e.g., core 402) issues a write request. As in the other states, core 402 sets a state in the tracking logic to indicate that the cache line 404 is held in a long-hold state. This status blocks any read or write requests from other cores (e.g., core 406). Thus, a read or write request issued by core 406 (operation 424) will be blocked. Core 402 may continue to hold cache line 404 as exclusive until a store instruction is executed that releases the lock and clears the long hold. In various embodiments, this store instruction can be a special instruction (e.g., a new instruction implemented in firmware and/or Instruction Set Architecture) or a hint instruction, such as a Next Instruction Access Intent (NIAI) instruction, on an existing store instruction.

Figure 5:
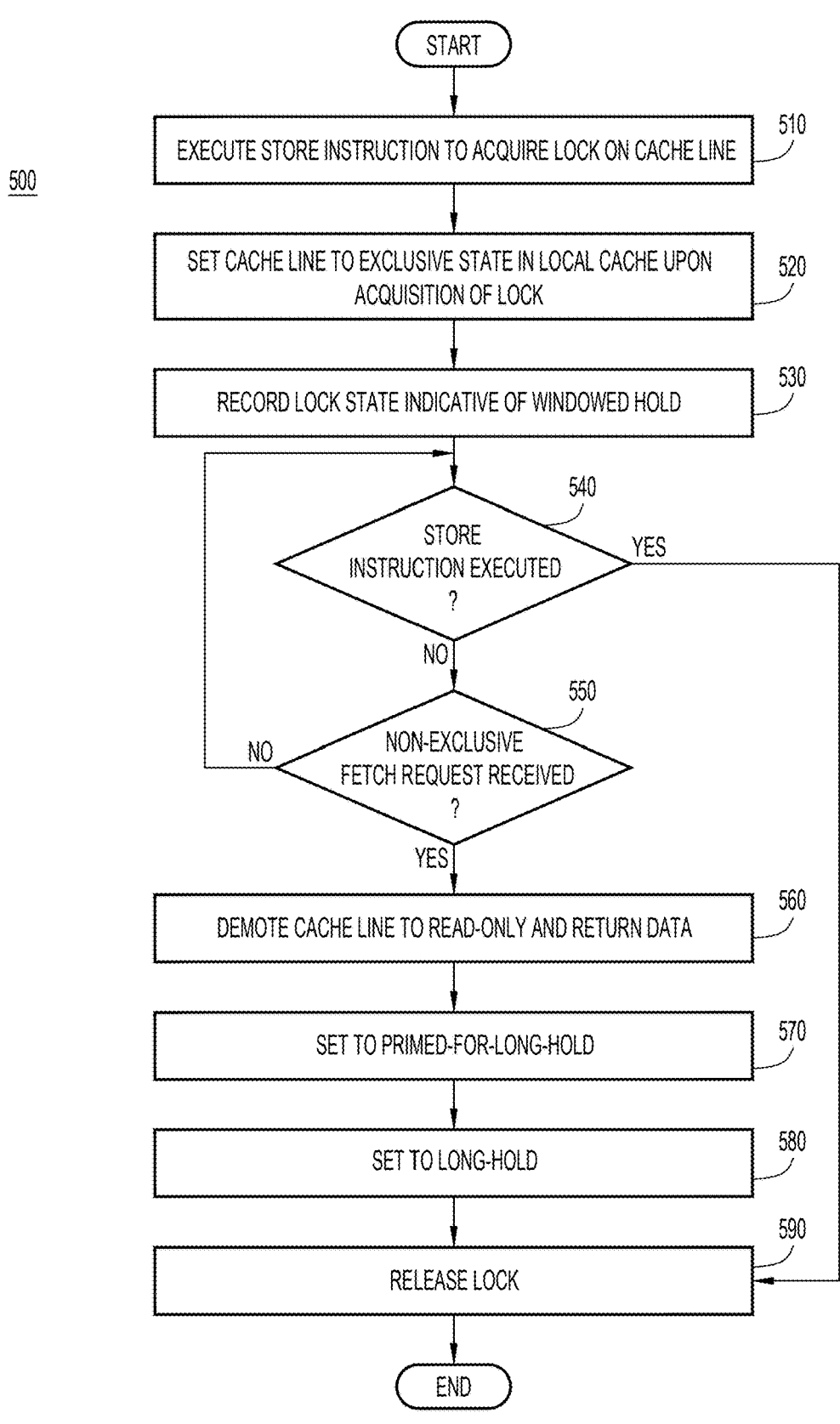
FIG. 5 is a flowchart of a method for utilizing a windowed hold according to an embodiment of the present invention.

FIG. 5 is a flowchart of a method 500 for utilizing a windowed hold according to an embodiment of the present invention.

A store instruction is executed to acquire a lock on a cache line at operation 510. In a multiprocessing system in which multiple cores can contend over cache lines, a processor may execute a store instruction that attempts to acquire a lock on the cache line in order to set a windowed hold state. This instruction can be its own special instruction, or a hint instruction that is included on a preexisting instruction. The lock is successfully acquired when the processor is able to store the lock value (e.g., the cache line is not held as exclusive by another processor).

The cache line is set to an exclusive state in a local cache upon acquisition of the lock at operation 520. The processor that initiated the store instruction can write an entry in the processor's local cache (e.g., an STB/STQ) that indicates that the cache line is held as exclusive, which would prevent other processors from accessing the cache line in conventional approaches. However, the windowed hold provides a mechanism for another processor to temporarily access the cache line.

A lock state indicative of a windowed hold is recorded at operation 530. Once the processor locks the cache line, the windowed hold state is recorded in tracking logic of the multiprocessing system. The tracking logic may be centralized or distributed across caches of the various cores; entries in the tracking logic enforce the various locks described herein. In the case of a windowed hold state, the tracking logic is configured to enable another core to access data in the cache line subject to the windowed hold.

Operation 540 determines whether a store instruction is executed by the holding processor. If the holding processor completes the store instruction, then the holding processor can release the lock (operation 590) so that the cache line can be acquired by another processor. If the holding processor has not completed a store instruction, then the windowed hold remains, and at operation 550, the logic determines whether a non-exclusive fetch request has been received from another processor. If a non-exclusive fetch request is not received, the holding processor may continue to process its queue at operation 540 until a store operation is completed, at which point the lock is released at operation 590.

If a non-exclusive fetch request is received from another processor, then the cache line is demoted to read-only and data is returned to the requesting processor at operation 560. When the holding processor receives a non-exclusive fetch request from another processor, the holding processor demotes the cache line from exclusive to read-only, enabling the requesting processor to read the data while still blocking any write requests. In some embodiments, an indication that the cache line is held in a windowed state or read-only state by the holding processor is also returned; this indication can used to add an entry to tracking logic so that the other processors can determine the state of the cache line without having to issue requests to the holding processor.

In some embodiments, the indication that the cache line is held can be used to set a condition code on a requesting processor if a Tentative Exclusive Load & Test (TELT) instruction is implemented in the multiprocessing system. A TELT instruction may be issued by the core in the same way as a Load & Test instruction. The TELT instruction can either return the cache line and perform a test or can get a reject response. The reject response does not return the cache line data and therefore does not install it in the cache. Instead, the reject response is treated in the same way as if the Load & Test instruction failed. The TELT instruction may be beneficial as it may enable the TELT issuing core to recognize that another core is "stiff-arming" (i.e., the core has the line locked and is not allowing any other cores to obtain access of the line), and based on that information, pause the current work item and select different work from its own queue, then return to this line later, thereby improving overall performance. Thus, a TELT is non-blocking (i.e., provides a reject response without changing a cache line state). A TELT may provide a faster response to the requesting core such that it enables other cores to work on other tasks based on the condition code response information returned. Another advantage is that the TELT instruction does not steal the cache line from the lock owner (e.g., no exclusive fetch prior to unlock is needed). The indication that the cache line is being held may also be used to set different line fairness behavior on the requesting processor. To change line fairness behavior, the system can deprioritize the requesting processor (causing the processor to wait longer before being granted access to a cache line), prioritize the requesting processor, change request behavior (e.g., changing an exclusive fetch to a non-exclusive fetch), stall processors, and the like.

The cache line is set to a primed-for-long-hold state at operation 570. Subsequent to demoting the cache line to read-only and returning the data, the holding processor may set a state in the tracking logic that sets the cache line to a primed-for-long-hold state in preparation for performing a long-hold. In the primed-for-long-hold state, an exclusive fetch request from another core will be rejected, but non-exclusive fetch requests are permitted.

The cache line is set to a long-hold state at operation 580. The cache line is set from the primed-for-long-hold state to the long-hold state in response to the holding processor issuing a write request, which causes the holding processor to reacquire the cache line as exclusive. During the long-hold, any read or write requests from other cores will be rejected by the tracking logic.

The lock is released at operation 590. In response to the holding processor (which now holds the cache line as exclusive in a long-hold) executing a second store instruction, the lock is released and the long hold is cleared. Thus, the cache line cycles through a windowed hold state, a primed-for-long-hold state, a long-hold state, and after the store instruction, the lock of cache line is released. The lock may also be released when the holding processor executes a store instruction while holding the cache line in a windowed hold state or while holding the cache line in a primed-for-long-hold state.

It will be appreciated that the embodiments described above and illustrated in the drawings represent only a few of the many ways of implementing embodiments for reducing cache contention in a multiprocessing system.

The environment of the present invention embodiments may include any number of computer or other processing systems (e.g., any computing device, computing service, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., application code 200, application(s) 210, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, distributed computing, and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the computing system. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., application data, data processed by multiprocessing computing environment 300, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The application data, data processed by multiprocessing computing environment 300, and/or any other data may include any information arranged in any fashion, and may be configurable based on rules or other criteria to provide desired information to a user.

The present invention embodiments are not limited to the specific tasks or algorithms described above, but may be utilized for reducing cache line contention in a multiprocessing computing system.

The data may include any format of storing data and may include any data descriptive of databases, including metadata and indexes thereof. The data may be obtained via any techniques, and may be accessed over a network, fetched from local storage, provided via user input, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   executing, by a first processor, a store instruction to acquire a lock on a cache line in a shared memory system of a multiprocessor computing system;

setting, by the first processor, the cache line to an exclusive state in a local cache of the first processor upon successful acquisition of the lock; and recording a lock state indicative of a windowed hold on the cache line by the first processor, wherein the windowed hold enables non-exclusive fetch requests from one or more other processors.

2. The method of claim 1, further comprising:

receiving a non-exclusive fetch request from a second processor;

in response to receiving the non-exclusive fetch request, demoting, by the first processor, the cache line to read-only; and returning, by the first processor, data of the cache line to the second processor.

3. The method of claim 2, wherein the returning further comprises returning an indication that the cache line is held in the windowed hold by the first processor.

4. The method of claim 1, further comprising:

in response to receiving a non-exclusive fetch request from a second processor, setting, by the first processor, the cache line to a primed-for-long-hold state, wherein the primed-for-long-hold state causes an exclusive fetch request for the cache line by the one or more other processors to be rejected and permits a read-only request for the cache line by the one or more other processors.

5. The method of claim 4, further comprising:

in response to a write request being issued by the first processor, reacquiring, by the first processor, the cache line in the exclusive state; and recording the lock state indicative of a long-hold on the cache line by the first processor, wherein the lock state indicative of the long-hold causes read and write requests to the cache line by the one or more other processors to be rejected.

6. The method of claim 5, further comprising:

completing, by the first processor, a second store instruction and in response, releasing the lock and clearing the lock state.

7. The method of claim 1, wherein the store instruction comprises a hint instruction on a compare and swap instruction.

8. The method of claim 1, wherein the store instruction comprises a Next Instruction Access Intent (NIAI) hint instruction preceding the store instruction.

9. A computer system comprising:

a processor set;

one or more computer-readable storage medium; and program instructions stored on the one or more computer-readable storage medium to cause the processor set to perform operations comprising:

executing, by a first processor, a store instruction to acquire a lock on a cache line in a shared memory system of a multiprocessor computing system;

setting, by the first processor, the cache line to an exclusive state in a local cache of the first processor upon successful acquisition of the lock; and recording a lock state indicative of a windowed hold on the cache line by the first processor, wherein the windowed hold enables non-exclusive fetch requests from one or more other processors.

10. The computer system of claim 9, wherein the program instructions further cause the processor set to perform operations comprising:

receiving a non-exclusive fetch request from a second processor;

in response to receiving the non-exclusive fetch request, demoting, by the first processor, the cache line to read-only; and returning, by the first processor, data of the cache line to the second processor.

11. The computer system of claim 10, wherein the returning further comprises returning an indication that the cache line is held in the windowed hold by the first processor.

12. The computer system of claim 9, wherein the program instructions further cause the processor set to perform operations comprising:

in response to receiving a non-exclusive fetch request from a second processor, setting, by the first processor, the cache line to a primed-for-long-hold state, wherein the primed-for-long-hold state causes an exclusive fetch request for the cache line by the one or more other processors to be rejected and permits a read-only request for the cache line by the one or more other processors.

13. The computer system of claim 12, wherein the program instructions further cause the processor set to perform operations comprising:

in response to a write request being issued by the first processor, reacquiring, by the first processor, the cache line in the exclusive state; and recording the lock state indicative of a long-hold on the cache line by the first processor, wherein the lock state indicative of the long-hold causes read and write requests to the cache line by the one or more other processors to be rejected.

14. The computer system of claim 13, wherein the program instructions further cause the processor set to perform operations comprising:

completing, by the first processor, a second store instruction and in response, releasing the lock and clearing the lock state.

15. The computer system of claim 9, wherein the store instruction comprises a hint instruction on a compare and swap instruction.

16. The computer system of claim 9, wherein the store instruction comprises a Next Instruction Access Intent (NIAI) hint instruction preceding the store instruction.

17. A method comprising:

executing, by a first processor, a non-exclusive fetch request to fetch data from a cache line that is held in a windowed hold state by a second processor, wherein the windowed hold state enables the second processor to provide data in the cache line to the first processor;

in response to receiving the non-exclusive fetch request, demoting, by the second processor, the cache line to read-only; and obtaining, by the second processor, the data in the cache line that is subject to the non-exclusive fetch request.

18. The method of claim 17, further comprising:

in response to receiving the non-exclusive fetch request, receiving, by one or more other processors, an indication that the cache line is held in the windowed hold state by the second processor.

19. The method of claim 18, wherein the indication prevents the one or more other processors from issuing a fetch request for the cache line.

20. The method of claim 17, wherein the second processor sets the cache line to a primed-for-long-hold state in response to receiving the non-exclusive fetch request from the first processor, wherein the primed-for-long-hold state causes an exclusive fetch request for the cache line by one or more other processors to be rejected and permits a read-only request for the cache line by the one or more other processors.

* * * * *